(12) United States Patent
Kaluzhny

(10) Patent No.: US 10,057,064 B2
(45) Date of Patent: Aug. 21, 2018

(54) COMPUTATIONAL METHOD, COMPUTATIONAL DEVICE AND COMPUTER SOFTWARE PRODUCT FOR MONTGOMERY DOMAIN

(71) Applicant: Winbond Electronics Corp., Taichung (TW)

(72) Inventor: Uri Kaluzhny, Taichung (TW)

(73) Assignee: Winbond Electronics Corp., Taichung (TW)

( * ) Notice: Subject to any disclaimer, the term of this patent is extended or adjusted under 35 U.S.C. 154(b) by 246 days.

(21) Appl. No.: 15/073,616

(22) Filed: Mar. 17, 2016

(65) Prior Publication Data

US 2017/0026178 A1 Jan. 26, 2017

(30) Foreign Application Priority Data

Jul. 22, 2015 (IL) .......................... 240100

(51) Int. Cl.
*H04L 29/06* (2006.01)
*H04L 9/30* (2006.01)
*G06F 7/72* (2006.01)

(52) U.S. Cl.
CPC ............ *H04L 9/3066* (2013.01); *G06F 7/725* (2013.01); *G06F 2207/7223* (2013.01)

(58) Field of Classification Search
CPC ............. G06F 17/30097; H04L 9/3281; H04L 9/3252; H04L 9/3236; H04L 63/12
See application file for complete search history.

(56) References Cited

U.S. PATENT DOCUMENTS

2006/0045262 A1* 3/2006 Orlando ................. G06F 7/725
380/28

OTHER PUBLICATIONS

Ors S B et al., "Hardware Implementation of an Elliptic Curve Processor over GF(p)," Application-Specific Systems, Architectures, and Processors, 2003. Proceedings. IEEE International Conference on Jun. 24-26, 2003, pp. 420-430.
Michael Tunstall et al., "Coordinate Blinding over Large Prime Fields",Aug. 17, 2010, Network and Parallel Computing, Lecture Notes in Computer Science; Lect.Notes Computer, Springer International Publishing, Cham, pp. 443-455.
Mehmet Adalier et al.,"Efficient and Secure Elliptic Curve Cryptography Implementation of Curve P-256", NIST—Workshop on Elliptic Curve Cryptography Standards, Jun. 12, 2015, Retrieved from the Internet , URL:http://csrc.nist.gov/groups/ST/ecc-workshop-2015/papers/session6-adalier-mehmet.pdf,retrieved on Nov. 24, 2016.

(Continued)

*Primary Examiner* — Joseph P. Hirl
*Assistant Examiner* — Leynna Truvan
(74) *Attorney, Agent, or Firm* — JCIPRNET

(57) ABSTRACT

In Elliptic Curve Cryptography (ECC), one performs a great number of modular multiplications. These are usually done by Montgomery Multiplication algorithm, which needs the operands to be preprocessed (namely, converted to the Montgomery Domain), which is normally done by an equivalent of a long division. We provide a method to perform this conversion by a single Montgomery multiplication on the raw data. The method is formulated for elliptic curve points represented in Jacobian coordinates but can be extended to other representations.

9 Claims, 2 Drawing Sheets

(56) References Cited

OTHER PUBLICATIONS

Jianxin Wang et al.,"Dual-form Elliptic Curves Simple Hardware Implementation", Network and Parallel Computing, vol. 7389, Springer International Publishing,Cham 032548, Jan. 1, 2012, pp. 520-527.

Tobias Markmann, "Modern Elliptic Curve Cryptography for Constrained Devices",Apr. 9, 2015, Retrieved from the Internet ,URL:https://inet.haw-hamburg.de/teaching/ws-2014-15/project-class/tobias-markmann-modem-elliptic-curve-cryptography-for-constrained-devices, retrieved on Nov. 24, 2016.

"Search report of European Counterpart Application," dated Dec. 19, 2016, p. 1-p. 9, in which the listed references were cited.

* cited by examiner

COMPUTATIONAL METHOD, COMPUTATIONAL DEVICE AND COMPUTER SOFTWARE PRODUCT FOR MONTGOMERY DOMAIN

CROSS-REFERENCE TO RELATED APPLICATION

This application claims the priority benefit of Israel application serial no. 240100, filed on Jul. 22, 2015. The entirety of the above-mentioned patent application is hereby incorporated by reference herein and made a part of this specification.

BACKGROUND OF THE INVENTION

1. Field of the Invention

The present invention relates generally to computational circuits and methods, and particularly to efficient modular computations.

2. Description of Related Art

In Elliptic Curve Cryptography (ECC), arithmetic operations are performed over the points on a chosen elliptic curve. These points can be represented in the standard, canonical form as pairs of numbers (x,y) satisfying a specified equation. In most cases this equation can be written in the short Weierstrass form as $y^2=x^3+A*x+B$, wherein A and B are constants that define the elliptical curve. The numbers A, B, x and y are taken from a fixed finite field, such as the field of integers with modulus M, wherein M is a large prime number, and operations on the numbers are performed over this field.

In general, ECC algorithms involve two operations that are performed over the points of a chosen elliptic curve:

Point addition: $(x_1,y_1)+(x_2,y_2)=(x_3,y_3)$

Point doubling: $2(x_1,y_1)=(x_3,y_3)$

The straightforward definition of these operations involves modular division, which is a heavy, time-consuming operation.

Therefore, it is common practice to represent the points on the elliptic curve in alternative coordinates that allow the point addition and point doubling operations to be performed as a sequence of modular additions and multiplications. Jacobian coordinates are widely used for this purpose, wherein each point (x,y) on the elliptic curve is represented by three numbers (X,Y,Z), chosen such that the original elliptic coordinates x and y can be expressed as quotients of powers of the alternative coordinates X, Y and Z:

$$x = \frac{X}{Z^2}, y = \frac{Y}{Z^3}$$

Other representations that can be used in a similar way to enhance computation efficiency over elliptic curves include projective coordinates (in which $x=X/Z$ and $y=Y/Z$); W12 coordinates ($x=X/Z$, $y=Y/Z^2$); XYZZ coordinates ($x=X/ZZ$, $y=Y/ZZZ$, and $ZZ^3=ZZZ^2$); and XZ coordinates ($x=X/Z$). Representations of this sort are referred to in the present description and in the claims as "quotient-based representations," since each of the elliptic coordinates x and y is represented as a quotient of certain powers of the alternative coordinates. Further information regarding such representations and their use in elliptic curve computations is available on the hyperelliptic.org Web site.

Even in Jacobian coordinates, however, elliptic curve computations are time-consuming. The classical method of calculating a modular product involves first multiplying the operands as non-modular integers and then taking the modulus of the result, referred to as "modular reduction." Modular reduction itself is computationally expensive, equivalent to long division. Point doubling and point addition involve many such operations.

For this reason, cryptographic computations often use a more efficient method, known as Montgomery modular multiplication (or simply Montgomery multiplication). To perfon in Montgomery multiplication, the operands are converted to a special Montgomery form using an algorithm known as Montgomery reduction. Multiplication of the operands in Montgomery form avoids the need for modular reduction as required in conventional arithmetic. The Montgomery reduction and multiplication algorithms are described, for example, by Menezes et al., in the Handbook of Applied Cryptography (1996), section 14.3.2, pages 600-603, which is incorporated herein by reference.

To summarize briefly, given two large integers A and B, instead of calculating A*B, Montgomery multiplication produces $A\odot B=A*B*R^{-1}\% M$, wherein R is a constant depends on the length of the modulus M. (The symbol "%" is used in the present description and in the figures to denote "modulo.") For this purpose, the input operands are first preprocessed (referred to as converting the operands to the Montgomery domain or to Montgomery form), so that each input X is converted to $X'=X*R \% M$. The Montgomery-form operands are then multiplied together as follows:

$$A'\odot B'=A*R*B*R*R^{-1}\% M=(A*B)'\% M.$$

A chain of calculations can be perfoiined in this manner in the Montgomery domain. The final result Res' is then converted back to integer form using Montgomery multiplication by 1: $Res' \odot 1=Res*R*R^{-1}\% M=Res$.

SUMMARY OF THE INVENTION

Embodiments of the present invention that are described hereinbelow provide methods and apparatus that are useful in simplifying and enhancing the efficiency of operation in the Montgomery domain.

There is therefore provided, in accordance with an embodiment of the invention, a method for computation, which includes receiving, in a Montgomery multiplier circuit, a pair of input coordinates (x,y) specifying a point on an elliptic curve in a canonical form. The pair of the input coordinates is converted to a quotient-based representation including three alternative coordinates (X',Y',Z') in a Montgomery form by performing first Montgomery multiplications of the input coordinates by selected conversion factors. One or more elliptic curve operations are carried out by applying second Montgomery multiplications to the alternative coordinates in the Montgomery form.

In a disclosed embodiment, the alternative coordinates include Jacobian coordinates.

Typically, performing the first Montgomery multiplications includes applying a Montgomery multiplication by 1 in computing at least one of the alternative coordinates. In a disclosed embodiment, performing the first Montgomery multiplications includes selecting conversion factors ω, α and β, wherein α and β are powers of ω, and calculating the alternative coordinates as Montgomery products of α and β with the input coordinates, such that $X'=a\odot x$, $Y'=(\beta\odot y)\odot 1$, and $Z'=(A)$, wherein the symbol "⊙" signifies Montgomery multiplication. In one embodiment, co is a random integer, $\alpha=\omega^2$, and $\beta=\omega^3$.

In a disclosed embodiment, carrying out the one or more elliptic curve operations includes calculating a result expressed in the quotient-based representation in the Montgomery form, and applying at least one of the second Montgomery multiplications in returning the result to the canonical form.

There is also provided, in accordance with an embodiment of the invention, a computational device, including inputs configured to receive a pair of input coordinates (x,y) specifying a point on an elliptic curve in a canonical form. A Montgomery multiplier circuit is configured to convert the pair of the input coordinates to a quotient-based representation including three alternative coordinates (X',Y',Z') in a Montgomery form by performing first Montgomery multiplications of the input coordinates by selected conversion factors, and to carry out one or more elliptic curve operations by applying second Montgomery multiplications to the alternative coordinates in the Montgomery form.

There is additionally provided, in accordance with an embodiment of the invention, a computer software product, including a non-transitory computer-readable medium in which program instructions are stored, which instructions, when read by a programmable processor, cause the processor to receive a pair of input coordinates (x,y) specifying a point on an elliptic curve in a canonical form. The instructions cause the processor to convert the pair of the input coordinates to a quotient-based representation comprising three alternative coordinates (X',Y',Z') in a Montgomery form by performing first Montgomery multiplications of the input coordinates by selected conversion factors, and to carry out one or more elliptic curve operations by applying second Montgomery multiplications to the alternative coordinates in the Montgomery form.

BRIEF DESCRIPTION OF THE DRAWINGS

The present invention will be more fully understood from the following detailed description of the embodiments thereof, taken together with the drawings in which.

DESCRIPTION OF THE EMBODIMENTS

Figure 1:
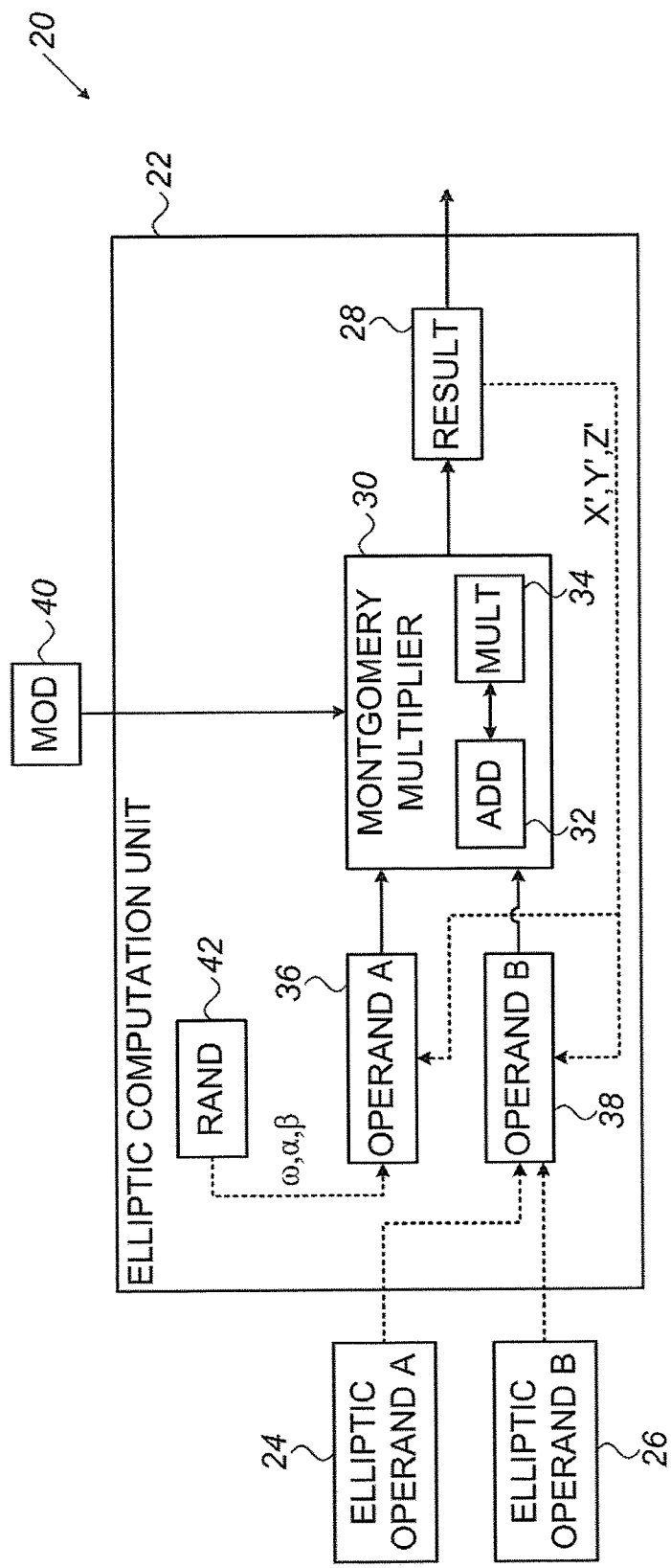
FIG. 1 is a block diagram that schematically illustrates circuit elements in a cryptographic device, in accordance with an embodiment of the invention.

Although the computational complexity of elliptic curve operations can be reduced by converting the coordinates to a Jacobian representation (or other quotient-based representation) in the Montgomery domain, this conversion itself involves a number of time-consuming computational steps. Furthermore, for reasons of security, it is desirable to randomize the coordinates, for example by multiplying them by a constant factor, adding yet another computational step.

Embodiments of the present invention that are described herein reduce the computational complexity of elliptic curve computations still further by simplifying the steps of coordinate conversion. In the disclosed embodiments, a pair of input coordinates (x,y), specifying a point on an elliptic curve in canonical form, are converted to an alternative, quotient-based representation (X',Y',Z') in Montgomery form by Montgomery multiplications of the input coordinates by selected conversion factors. One or two Montgomery multiplications of each of the input coordinates are generally sufficient to generate each of X' and Y', while Z' is generated by a simple arithmetic calculation.

The same Montgomery multiplication circuit that performing the coordinate conversion can then be used to carry out elliptic curve operations by applying further Montgomery multiplications to the alternative coordinates thus derived. The last of these Montgomery multiplications can be used to return the result of these operations from the quotient-based representation in Montgomery form to the canonical form.

In the disclosed embodiments, the Montgomery multiplications that are used in converting the input coordinates (x,y) to the alternative coordinates (X',Y',Z') include at least one Montgomery multiplication by 1. As noted earlier, Montgomery multiplication of a value by 1 means, in ordinary arithmetic terms, multiplication by $R^{-1}$ mod M, which thus introduces a factor of $R^{-1}$ into the quotient-based coordinates. As a specific example, the Montgomery multiplier can use selected integer factors $\omega$, $\alpha$ and $\beta$, wherein $\alpha$ and $\beta$ are powers of $\omega$, to perform the conversion by computing Montgomery products of $\alpha$ and $\beta$ with the input coordinates, such that $X'=\alpha\odot x$, $Y'=(\beta\odot y)\odot 1$, and $Z'=\omega$. For conversion to Jacobian coordinates, the factors $\alpha$ and $\beta$ are computed as $\alpha=\omega^2$, and $\beta=\omega^3$. For purposes of coordinate randomization, $\omega$ may be a random or pseudo-random value.

Although the embodiments described hereinbelow refer specifically, for the sake of concreteness and clarity, to representation of elliptic curve points in Jacobian coordinates, the principles of these embodiments may be extended in a straightforward manner to other quotient-based representations, such as projective coordinates, W12 coordinates, XYZZ coordinates, or XZ coordinates, for example. All such alternative implementations are considered to be within the scope of the present invention.

FIG. 1 is a block diagram that schematically illustrates circuit elements in a cryptographic device 20, in accordance with an embodiment of the invention. The circuit elements shown in the figure are typically implemented as hardware logic circuits in an integrated circuit (IC) device, but may alternatively be implemented as modules in software on a suitable programmable processor. The pictured circuits carry out elliptic curve computations and Montgomery multiplication functions that may be integrated into the cryptographic device in a wide variety of different configurations and applications, to perform operations connected with encryption, decryption, and/or authentication, for example. Only the elements of device 20 that are directly relevant to the elliptic curve computations and Montgomery multiplication are shown in the figure, and the integration of these elements with other components of device 20 will be apparent to those skilled in the art.

Device 20 comprises an elliptic computation unit 22, which has a pair of operand inputs 24, 26 to receive elliptic operands, and a modulus input 40, which receives the value of the modulus M that is to be used in the computations. Unit 22 comprises a Montgomery multiplier 30, which receives Montgomery operands A and B from internal inputs 36 and 38 and computes their Montgomery product $A\odot B = A*B*R^{-1}\%$ M. Multiplier 30 outputs the result of the computation to an output 28, whose contents may be delivered to other components of device 20 or fed back to one or both of inputs 36, 38 for subsequent computations, such as multiple, successive multiplications that are used in elliptic curve computations.

Multiplier 30 comprises arithmetic circuits, including at least one adder circuit 32 and at least one multiplier circuit 34, with suitable interconnections for performing the iterative computations that are involved in Montgomery multiplication of large numbers. The adder and multiplier typically operate on blocks of a predefined size, such as thirty-two bits. Inputs 24, 26, 36, 38 and 40 and output 28 are typically integers of length m=n*block size, or specifically m=32n bits in the present example, such as 128 bits. The inputs and output can conveniently be implemented as locations in a memory array.

For purposes of efficient conversion of the elliptic operands in inputs 24 and 26 into randomized, quotient-based Montgomery form, computation unit 22 comprises a random number generator 42, which outputs a random or pseudo-random integer value ω for use in each such conversion. (The term "random," as used in the present description and in the claims, should be understood as including "pseudo-random" numbers, as well, unless the context indicates otherwise.) The value ω may be of any desired length, but it is convenient that its length be equal to the block size of Montgomery multiplier 30, i.e., thirty-two bits in the present example. For conversion to the Jacobian representation, multiplier 30 makes use of the values $\alpha=\omega^2$ and $\beta=\omega^3$, which are generated by arithmetic (not modular) multiplication, performed either by multiplier circuit 34 or by a dedicated multiplier associated with random number generator 42.

Figure 2:
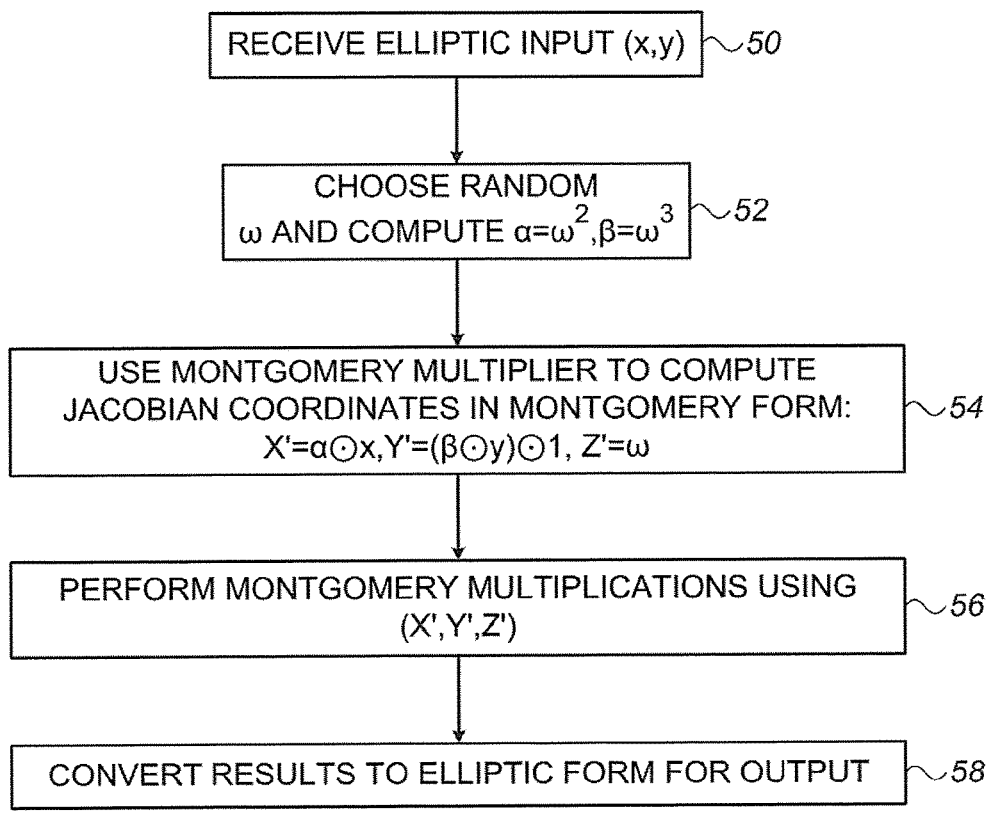
FIG. 2 is a flow chart that schematically illustrates a method for performing elliptic curve computations, in accordance with an embodiment of the invention.

FIG. 2 is a flow chart that schematically illustrates a method for performing elliptic curve computations, in accordance with an embodiment of the invention. This method is described hereinbelow, for the sake of clarity and convenience, with reference to the elements of device 20 that are shown in FIG. 1. Alternatively, the method may be carried out, mutatis mutandis, in other hardware configurations or in software, as noted above. All such alternative implementations are considered to be within the scope of the present invention.

The method is initiated when elliptic computation unit 22 receives one or more new operands in input(s) 24 and/or 26, at an input step 50. As explained above, the inputs comprise coordinates (x,y) specifying a point on an elliptic curve in canonical form. To convert the inputs to Jacobian coordinates (X',Y',Z') in Montgomery form, unit 22 requests a random value ω from random number generator 42, and computes the random parameters $\alpha=\omega^2$ and $\beta=\omega^3$, at a parameter generation step 52. The parameters α and β are fed to input 36 of Montgomery multiplier 30, while the elliptic input coordinates x and y are fed to input 38. Multiplier 30 performs Montgomery multiplications of these values in order to compute the Jacobian coordinates, at a coordinate conversion step 54.

As noted earlier, Montgomery multiplier 30 computes the Jacobian coordinates at step 54 according to the following formulas:

$$X'=\alpha\odot x, Y'=(\beta\odot y)\odot 1, Z'=\omega.$$

The validity of these formulas is shown by the following derivation:

$$X'=\omega^2*x*R^{-1}\% =(\omega*R^{-1})^2*x*R\% \ M,$$

$$X=(\omega*R^{-1})^2*x,$$

$$Y'=(\omega^3*y*R^{-1})*1*R^{-1}\% \ M=(\omega*R^{-1})^3*y*R\% \ M,$$

$$Y=(\omega*R^{-1})^3*y,$$

$$Z'=(\omega*R^{-1})*R\% \ M,$$

$$Z=(\omega*R^{-1}),$$

The converted coordinates in normal form (X,Y,Z), as provided by the above derivation, thus satisfy the formal definition of Jacobian conversion: $x=X*Z^{-2}\% \ M$; $y=Y*Z^{-3}\% \ M$.

The converted coordinate values X', Y' and Z' are fed back from output 28 to inputs 36 and 38 for use in subsequent operations by Montgomery multiplier 30, in an elliptical computation step 56. Typically, multiple multiplications of this sort, as well as modular additions, are used in order to complete each point addition or point doubling operation that elliptic computation unit 22 is asked to carry out.

Upon conclusion of the elliptic computation in the Jacobian Montgomery form, the result is fed back from output 28 to one of inputs 36 and 38. Multiplier 30 performs Montgomery multiplication of the results by 1 (in the Montgomery domain) to convert them back to normal Jacobian coordinates (X,Y,Z), followed by a modular division: $x=X*Z^{-2}\% \ M$, $y=Y*Z^{-3}\% \ M$, in order to covert the final result back to canonical form for output from unit 22, at a result conversion step 58.

As noted earlier, in an alternative embodiment of the present invention, the steps and operations described above are carried out by a suitable programmable processor under the control of software program instructions. The software may be downloaded to the processor in electronic form, for example over a network. Additionally or alternatively, the software may be stored on tangible, non-transitory computer-readable media, such as optical, magnetic, or electronic memory media.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for computation, comprising:
receiving, in a Montgomery multiplier circuit, a pair of input coordinates (x,y) specifying a point on an elliptic curve in a canonical form;
converting the pair of the input coordinates to a quotient-based representation comprising three alternative coordinates (X',Y',Z') in a Montgomery form by performing first Montgomery multiplications of the input coordinates by selected conversion factors; and
carrying out one or more elliptic curve operations by applying second Montgomery multiplications to the alternative coordinates in the Montgomery form,
wherein a step of performing the first Montgomery multiplications comprises applying a Montgomery multiplication by 1 in computing at least one of the alternative coordinates;
selecting conversion factors ω, α and β, wherein α and β are powers of ω; and
calculating the alternative coordinates as Montgomery products of a and with the input coordinates, such that X'=α⊙x, Y'=(β⌊y)⊙1, and Z'=ω.

2. The method according to claim 1, wherein the alternative coordinates comprise Jacobian coordinates.

3. The method according to claim 1, wherein carrying out the one or more elliptic curve operations comprises calculating a result expressed in the quotient-based representation in the Montgomery form, and applying at least one of the second Montgomery multiplications in returning the result to the canonical form.

4. A computational device, comprising:
   inputs configured to receive a pair of input coordinates (x,y) specifying a point on an elliptic curve in a canonical form; and
   a Montgomery multiplier circuit, which is configured to convert the pair of the input coordinates to a quotient-based representation comprising three alternative coordinates (X',Y',Z') in a Montgomery form by performing first Montgomery multiplications of the input coordinates by selected conversion factors, and to carry out one or more elliptic curve operations by applying second Montgomery multiplications to the alternative coordinates in the Montgomery form,
   wherein the first Montgomery multiplications comprise a Montgomery multiplication by 1, wherein the Montgomery multiplier circuit is configured to receive conversion factors $\omega$, $\alpha$ and $\beta$, wherein $\alpha$ and $\beta$ are powers of $\omega$, and to calculate the alternative coordinates as Montgomery products of $\alpha$ and $\beta$ with the input coordinates, such that $X'=\alpha\odot x$, $Y'=(\beta\odot y)\odot 1$, and $Z'=\omega$.

5. The device according to claim 4, wherein the alternative coordinates comprise Jacobian coordinates.

6. The device according to claim 4, wherein the Montgomery multiplier circuit is configured to carry out the one or more elliptic curve operations by calculating a result expressed in the quotient-based representation in the Montgomery form, and applying at least one of the second Montgomery multiplications in returning the result to the canonical form.

7. A computer software product, comprising a non-transitory computer-readable medium in which program instructions are stored, which instructions, when read by a programmable processor, cause the processor to receive a pair of input coordinates (x,y) specifying a point on an elliptic curve in a canonical form, to convert the pair of the input coordinates to a quotient-based representation comprising three alternative coordinates (X',Y',Z') in a Montgomery form by performing first Montgomery multiplications of the input coordinates by selected conversion factors, and to carry out one or more elliptic curve operations by applying second Montgomery multiplications to the alternative coordinates in the Montgomery form,
   wherein the first Montgomery multiplications comprise a Montgomery multiplication by 1, wherein the instructions cause the processor to receive conversion factors $\omega$, $\alpha$ and $\beta$, wherein $\alpha$ and $\beta$ are powers of $\omega$, and to calculate the alternative coordinates as Montgomery products of $\alpha$ and $\beta$ with the input coordinates, such that $X'=\alpha\odot x$ $Y'=(\beta\odot y)\odot 1$, and $Z'=\omega$.

8. The product according to claim 7, wherein $\omega$ is a random integer, $\alpha=\omega^2$, and $\beta=\omega^3$.

9. The product according to claim 7, wherein the instructions cause the processor to carry out the one or more elliptic curve operations by calculating a result expressed in the quotient-based representation in the Montgomery form, and applying at least one of the second Montgomery multiplications in returning the result to the canonical form.

* * * * *